John J. Wilson.
Impt in Prop Blocks for Carriages.
113477     PATENTED APR 4 1871
Fig. 1.
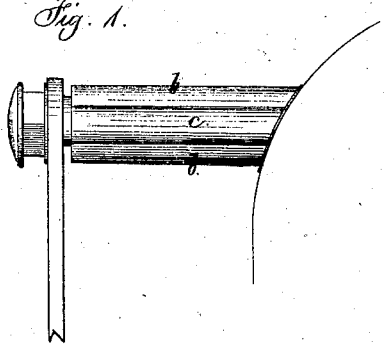
Fig. 3.        Fig. 2.
 
Witnesses,
Chas H Smith
Geo. Pinckney
John J. Wilson
Lemuel W. Serrell
att'y

United States Patent Office.

JOHN J. WILSON, OF NEW YORK, N. Y.

Letters Patent No. 113,477, dated April 4, 1871.

IMPROVEMENT IN BLOCKS FOR TOP-PROP JOINTS FOR CARRIAGES.

The Schedule referred to in these Letters Patent and making part of the same.

*To all whom it may concern:*

Be it known that I, JOHN J. WILSON, of the city and State of New York, have invented an Improvement in Prop-Blocks for Carriages; and the following is declared to be a correct description of the same.

A prop-block has heretofore been made of India rubber, with a cushion near the center for the bows of the carriage-top to rest upon, and with flanged heads or ends. In applying these prop-blocks difficulty arises in consequence of the carriage-irons varying in length to suit the shape of the carriage-top and of the carriage itself; and sometimes the cushioned upper surface does not properly sustain the bow.

My invention is made with reference to removing the aforesaid difficulties; and consists in an elastic prop-block tube, made of India rubber, of a uniform section throughout, or nearly so, and with a longitudinal rib running its entire length and forming the cushion for the bows.

This prop-block tube is a new article of manufacture, that is much superior to the prop-blocks heretofore made, because it can be cut off in lengths to suit the length of prop-iron, with the end next the carriage either at right angles or at an inclination, so as to fill up the entire space between the body of the carriage and the prop, thereby giving a neater finish and an extended bearing for the carriage-bow and greatly facilitating the manufacture and use of said elastic prop-block.

In the drawing—

Figure 1 is a plan of said prop-block;

Figure 2 shows the strip or tube of rubber previous to being cut into lengths for use; and Figure 3 is a cross-section of the prop-block tube.

The hole *a* through the prop-block tube should be polygonal, corresponding with the carriage-iron, and the tube itself is made of India rubber, of a cylindrical form at *b*, and with a cushion, *c*, upon the upper part for the bows of the carriage-top to rest upon.

This prop-block tube is made of suitable length and of uniform sectional shape throughout, or nearly so, and the prop-block is to be cut off so as to fit upon the carriage-iron and fill the space allotted to it; a it will be apparent that this prop-block tube is adapted to any length of iron and shape of body of the particular carriage to which it is attached.

This prop-block tube is made with an elastic finish to the surface, formed by varnishing such tube in the same manner as India-rubber shoes, so that the prop-block will not require to be painted; hence the surface will not crack or become injured in use.

By having the prop-block tubes made in lengths sufficient for a number of prop-blocks the cost of manufacture is lessened, because there is not so much handling as with separate pieces; and this tube can be cut up in lengths as required, and thus prevent any waste of material, and at the same time the labor in fitting the prop-block in place is lessened.

I claim as my invention—

The prop-block tube, made of India rubber, in lengths of a uniform or nearly uniform section throughout, and with the elastic cushion upon its upper surface, as and for the purposes set forth.

Signed by me this 6th day of March, A. D. 1871.

JOHN J. WILSON.

Witnesses:
CHAS. H. SMITH,
GEO. T. PINCKNEY.